Patented Dec. 12, 1922.

1,438,598

UNITED STATES PATENT OFFICE.

JOSEPH A. JEFFERY, OF DETROIT, MICHIGAN, ASSIGNOR TO THE JEFFERY-DEWITT COMPANY, OF DETROIT, MICHIGAN, A CORPORATION OF MAINE.

CERAMIC INSULATING MATERIAL.

No Drawing.    Application filed January 3, 1921.   Serial No. 434,762.

*To all whom it may concern:*

Be it known that I, JOSEPH A. JEFFERY, a citizen of the United States, and a resident of Detroit, in the county of Wayne and State of Michigan, have made an invention appertaining to Ceramic Insulating Materials; and I do hereby declare the following to be a full, clear, and exact description of the invention, such as will enable others skilled in the art to which it appertains to make and use the same.

My invention relates to the production of a ceramic material and the raw batch thereof. The invention particularly has for its object to provide an insulating material of the porcelain type, which has high electrical resistance at atmospheric and higher temperatures and at the same time possesses the following additional valuable properties:—An exceptionally high mechanical strength, a vitreous structure throughout the mass, a low coefficient of thermal expansion, a high specific gravity, a high modulus of elasticity, a high thermal conductivity, a low specific heat and maximum physical and chemical homogeneity.

By reason of these properties the articles composed of the material embodying my invention are exceedingly valuable when used as insulators under conditions where a considerable resistance to impact, compression, tension, vibration and other mechanical strains, imperviousness to liquids and gases, and resistance to sudden temperature changes, are required.

The material of my invention is particularly valuable where the articles composed thereof are subjected to electrical stresses at high temperatures and to sudden and wide changes of temperature, since the material has a high dielectric strength over a wide range of temperature, a low thermal expansion; and hence may be subjected to the said conditions without serious electrical leakage or mechanical breakage of the insulator. My invention thus is of value when applied to insulators for spark plugs used in internal combustion engines, which require a high hot dielectric strength, a high mechanical strength, a high thermal diffusivity, and a low coefficient of thermal expansion to efficiently perform their functions.

Insulators of the porcelain type in general use do not possess the property of high dielectric strength at high temperatures because of the use of comparatively large amounts of feldspar, or other alkali metal compounds, as fluxes in the raw batch, which introduces a corresponding amount of one or more alkalies into the mixture. Consequently, the electrical resistance of such insulators decreases rapidly as the temperature increases. They do not possess the property of exceptionally high mechanical strength or of maximum physical stability because of a relatively low specific gravity, a low modulus of elasticity and indefinite chemical and physical homogeneity. They do not possess the property of exceptionally high thermal diffusivity because of this low specific gravity and indefinite chemical and physical homogeneity and do not possess a minimum coefficient of thermal expansion because of the chemical composition in respect to the uncombined materials resulting in the poor chemical and physical homogeneity mentioned above.

These defects in the porcelain type of insulator, well known in the art, I have overcome as follows: First, by using, in compounding the raw batch of the body, the alkaline earth oxides as the principal fluxes. These may be introduced in the form of mineralogical or raw compounds as talc or through definite, hard calcined, vitrified or fused minerals or through definite, hard calcined, vitrified or fused synthetic compounds as sources. Second, by using, in compounding the raw batch of the body, alumina and raw clays, consisting of kaolin alone or a mixture of kaolin and ball clays in proportions necessary for plasticity and practical working properties, and in such proportions that sillimanite will be formed when they are subjected to the proper temperature and the silica which splits off from the clay in forming sillimanite from the clay may combine with the alumina to form an additional amount of sillimanite whereby a large amount of sillimanite will be formed in the final body. The amounts of the ingredients, however, is governed by the use for which the product is intended and the properties, or their degrees, which it is desired to secure in the final product.

The quality of the final product may be controlled in the following way: 1. Increase of the hot dielectric strength and the toughness of the body are brought about by increasing the alkaline earth metal content and decreasing the alkali metal content in the final body composition; 2. Resistance to sudden temperature changes resulting from a low coefficient or thermal expansion of the body is brought about by a high content of sillimanite or other inert material in the final body composition; 3. The density of the body is controlled by the quality of the sillimanite and its amount with respect to the glassy matrix. All the above qualities are controlled not only by the chemical composition of the final product but also by the pyrochemical treatment of the materials.

The alkaline earth oxides may be introduced through the use of a number of different raw materials, such as magnesite or other magnesium carbonates, magnesium oxide, the hydrate of magnesia, either the artificial hydrate or mineral hydrate, Brucite, talc, and other magnesium compounds yielding the oxide or a silicate on heating; whiting, or other calcium, carbonates, calcium oxide, calcium hydrate, and other calcium compounds yielding the oxide or a silicate on heating; dolomite or other mixed calcium and magnesium carbonate, dolomitic oxide, dolomitic hydrate and other mixed calcium and magnesium compounds yielding the oxides or silicates on heating; or beryllium, barium, strontium, lithium and other alkaline earth metal compounds yielding the oxide or a silicate on heating.

While both alkali and alkaline earth oxides may be used as fluxes, the former, producing alkali metal silicates in the resulting material upon firing, seriously reduce the dielectric strength of the final product at high temperatures. The maximum amount of the oxides of the alkaline earth metals, or their equivalents, and the minimum amount of the oxides of the alkali metals, or their equivalents, possible, are used, in order to secure the requisite properties desired to be produced in the material resulting after firing, particularly as to the hot dielectric strength and resistance to sudden temperature changes. The exact proportion of one to the other will be governed by the use for which the final product is intended and the properties, or their degrees, which it is desired to secure in the article to be produced, and this proportion is particularly governed by the firing conditions commercially feasible in the ceramic art. The total amount of fluxing oxides used is determined by the chemical composition and the amount of the calcine selected to constitute the flux of the body batch.

The clay content may be formed of kaolin alone or a mixture of kaolin and ball clays, the latter being added for plasticity and general working properties of the raw body. It is, however, preferable to use a clay or a clay mixture that will mature at about the temperature at which the body containing the nonplastics and the plastics will mature in the firing. I find it preferable to use a mixture of Edgar's plastic clay in as large amount as the manufacturing conditions will permit, one or more ball clays, such as Johnson and Porter ball clay, to increase the plasticity and the proper working quality and a suitable amount of china clay, such as Harris clay, to make up the balance of the raw clay content. I have selected Edgars' plastic kaolin as the type of kaolin that I preferably use. A description of Edgars' plastic kaolin is given in the United States Geological Survey Paper No. 11, pages 83–85, 1903. Likewise the Johnson and Porter ball clay is the type of the ball clay that I preferably use and is described in the Tennessee Geological Survey Bulletin No. 5, pages 85–87, 1910. Also the Harris clay is a type of china clay that I find preferable and it is described in the United States Bureau of Mines, Bulletin No. 53, pages 150–151, 1913. A small amount of flux, such as feldspar, is preferably added to the clay mixture to control the texture of the final body.

The materials that form the raw batch are mixed in calculated and in such predetermined proportions that on firing to the required temperature to thoroughly vitrify the mass and allowing proper time for the pyrochemical reactions to reach completion, definite end products are formed, causing the resulting material to be practically in chemical and physical equilibria and of maximum density, both apparent and true.

An example of the possible compositions involving my invention is shown in the following table:

*Table No. 1.*

| Raw batch for combined synthetic sillimanite and flux.—Cone 18. | | Raw batch for the body.—Cone 17. | | Calculated end products in fired body. | | Collected totals. | Collected totals, 100% basis. |
|---|---|---|---|---|---|---|---|
| E. p. kaolin | 71.2 | Calcined $XAl_2O_3.SiO_2YMgO$. $Al_2O_3.4SiO_2$ | 58.24 | Sillimanite | 38.80 | 63.16 | 66.8 |
| $Al_2O_3.3H_2O$ | 21.0 | Feldspar | 2.91 | Glass matrix | 22.35 | 31.38 | 33.2 |
| Talc | 7.8 | Johnson and Porter ball clay (raw) | 9.72 | Sillimanite | 24.36 | | |
| | | Harris clay (raw) | 9.72 | $SiO_2$ | 9.03 | | |
| | | E. p. kaolin (raw) | 19.41 | $H_2O$ driven out | 5.46 | | |
| | 100.0 | | 100.0 | | 100.0 | 94.54 | 100.0 |

Table No. 2.

| Raw batch of the body.—Cone 18. | | Calculated end products in fired body.—Cone 18. | | Collected totals. | | Collected totals, 100% basis. |
|---|---|---|---|---|---|---|
| Talc | 5.20 | Glass matrix | 22.60 | Sillimanite | 58.70 | 66.80 |
| Al₂O₃ | 9.20 | Volatile | .50 | Glass matrix | 29.20 | 33.20 |
| Ball clay | 9.10 | Sillimanite | 58.70 | | | |
| Feldspar | 2.70 | Glass matrix | 2.70 | | | |
| Kaolins and ball clays | 73.80 | H₂O (driven out) | 11.60 | | | |
| | | Silica | 8.40 | | | |
| | 100.0 | | 100.0 | | 87.90 | 100.0 |

The compositions when suitably prepared in the raw batch by the usual processes of milling, blunging and filter-pressing, are plastic and may be worked and formed into the desired shapes in preparation for the kiln by any of the processes known to the art. The milling operation, however, should be sufficient to give the proper homogeneity for the purpose for which the body is intended.

Bodies made from this material may be glazed or unglazed depending upon the use to which the objects are to be put. The "fitting" of the glaze may require certain changes, well known in the ceramic art, in the body composition and it is understood that these changes may be made without departing from the spirit of my invention. It is, however, preferable that the glaze be so composed as to fit the body composition rather than that the body composition be materially altered. The glaze may be applied to the raw or to the bisque body according to the methods of manufacture and the results desired.

The final bodies produced by proper manipulating and firing of the materials contain a large amount of sillimanite, a small amount of glassy matrix and a small amount of silica. Moreover, the silica that is derived from the clay upon the formation of sillimanite from the clay when the batches are fired enters into solution or combination in the glassy matrix.

When the raw bodies are formed by casting processes, the raw batch is necessarily varied so as to permit the requisite flow of water into the mold from the slip by the use of a short clay, such as Harris clay. In order, however, to maintain the control of the maturing of the body in the firing and yet permit the proper removal of the water during the casting, dehydrated Edgars' plastic clay is used. To maintain this control of the maturing of the body the largest amount of the calcined or dehydrated Edgars' plastic clay is used that is consistent with the working conditions existing in the casting process. The balance of the clay content is made up of the short clay or nonplastic clay. To control the grain and texture of the final body, a slightly greater amount of feldspar is ordinarily required when the body is formed by the casting process.

In order to obviate prolixity in the claims, I have specified in some parts of the specification and in some of the claims a single compound of a particular class, but it is to be understood that the claim covers and comprehends in each case one or more compounds of that class and that I may use a plurality of compounds of the class named and yet be operating within the scope of the claim in question. Also where I refer to the amount of the flux in the claims, I have reference to the amount of the flux compounds, such as, talc and feldspar, as introduced originally even though the compounds are modified by prefiring and not to basic oxides of the fluxing metals nor to the modifications produced by the prefiring. It is to be understood, however, that I contemplate covering in such claims equivalent fluxing constituents whether claimed in the raw batch compositions or in the final product compositions.

I claim:

1. The raw batch of a ceramic insulating material comprising a calcined mixture of clay, alumina and an alkaline earth metal compound mixed with raw clay, the clay of the calcine maturing at the temperature of the formation of sillimanite, the raw clay content when heated by itself maturing at the temperature at which the ceramic body matures.

2. The raw batch of a ceramic insulating material comprising a calcined mixture of clay, alumina and about from 4% to 10% of flux mixed with raw clay, the clay of the calcine, when heated by itself, maturing at the temperature of the formation of sillimanite.

3. The raw batch of a ceramic insulating material comprising a calcined mixture of clay, alumina and about from 4% to 10% of flux mixed with raw clay, the clay of the calcine maturing at the temperature of the formation of sillimanite, the raw clay, when heated by itself, maturing at the temperature at which the ceramic body matures.

4. The process of making ceramic material, which consists in forming a synthetic compound containing sillimanite and an alkaline earth from a mixture containing alumina and clay, and mixing the synthetic compound with clay and an alkali and firing the mixture to produce sillimanite and a glassy matrix.

5. The process of making ceramic material, which consists in forming a synthetic compound containing sillimanite and an alkaline earth from a mixture containing alumina and clay, and mixing the synthetic compound with clay and an alkali and firing the mixture to produce sillimanite and a glassy matrix, the clay when heated by itself maturing at the temperature at which the ceramic body matures.

In testimony whereof I have hereunto signed my name to this specification.

JOSEPH A. JEFFERY.